Feb. 26, 1924. Re. 15,778

J. H. KOVAR ET AL.

CONDENSING APPARATUS FOR CARDING MACHINES

Original Filed June 16, 1920 2 Sheets-Sheet 1

Inventors-
John H. Kovar.
Joseph F. Schimek.
Alexander Cavedon.
By Attorney-
Geo. A. Kennedy.

Feb. 26, 1924.

J. H. KOVAR ET AL

Re. 15,778

CONDENSING APPARATUS FOR CARDING MACHINES

Original Filed June 16, 1920 2 Sheets-Sheet 2

Inventors-
John H. Kovar.
Joseph F. Schimek.
Alexander Cavedon.
By Attorney-
Geo. W. Kennedy Jr.

Reissued Feb. 26, 1924. Re. 15,778

UNITED STATES PATENT OFFICE.

JOHN H. KOVAR AND JOSEPH F. SCHIMEK, OF HOLDEN, MASSACHUSETTS, AND ALEXANDER CAVEDON, OF WOONSOCKET, RHODE ISLAND, ASSIGNORS TO CASHIKO MACHINE COMPANY, OF WORCESTER, MASSACHUSETTS, A CORPORATION OF MASSACHUSETTS.

CONDENSING APPARATUS FOR CARDING MACHINES.

Original No. 1,469,005, dated September 25, 1923, Serial No. 389,409, filed June 16, 1920. Application for reissue filed December 8, 1923. Serial No. 679,504.

*To all whom it may concern:*

Be it known that we, JOHN H. KOVAR, formerly a citizen of the Republic of Czechoslovakia and now a citizen of the United States, residing at Holden, in the county of Worcester and Commonwealth of Massachusetts, JOSEPH F. SCHIMEK, a citizen of the United States, residing at Holden, in the county of Worcester and Commonwealth of Massachusetts, and ALEXANDER CAVEDON, a citizen of the United States, residing at Woonsocket, in the county of Providence and State of Rhode Island, have invented a new and useful Improvement in a Condensing Apparatus for Carding Machines, of which the following, together with the accompanying drawings, is a specification.

Our invention relates to condensing apparatus used in connection with carding machines in the manufacture of yarn, and it has particular reference to condensing apparatus in which a plurality of tapes are employed to convey the web from the dividing rolls to rubbing or condensing aprons.

Condensing apparatus used in the manufacture of yarn must be extremely sensitive and accurate in its operation owing to the fragile nature of the material handled thereby, and as a result condensing apparatus, as heretofore constructed, has been highly complicated and difficult to maintain in proper operating condition. The principal object of our invention is to provide a tape condensing machine that is simple in construction and comprises a minimum number of parts. Further objects of our invention are to increase the accessibility of the moving parts of the machine, so that their operation may be readily observed, and to provide for the ready removal of the various parts for the purpose of inspection and repair. These and other advantageous features of our invention will hereinafter more fully appear, reference being had to the accompanying drawings, in which—

Similar reference characters refer to similar parts in the different figures.

Figure 1:
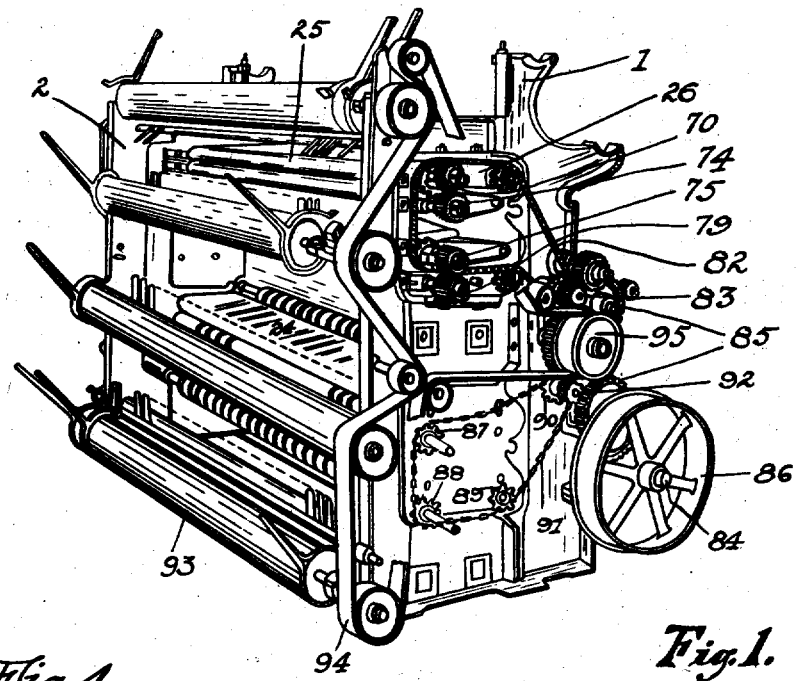
Figure 1 is a perspective view of a tape condensing machine embodying our invention.
Figure 2:
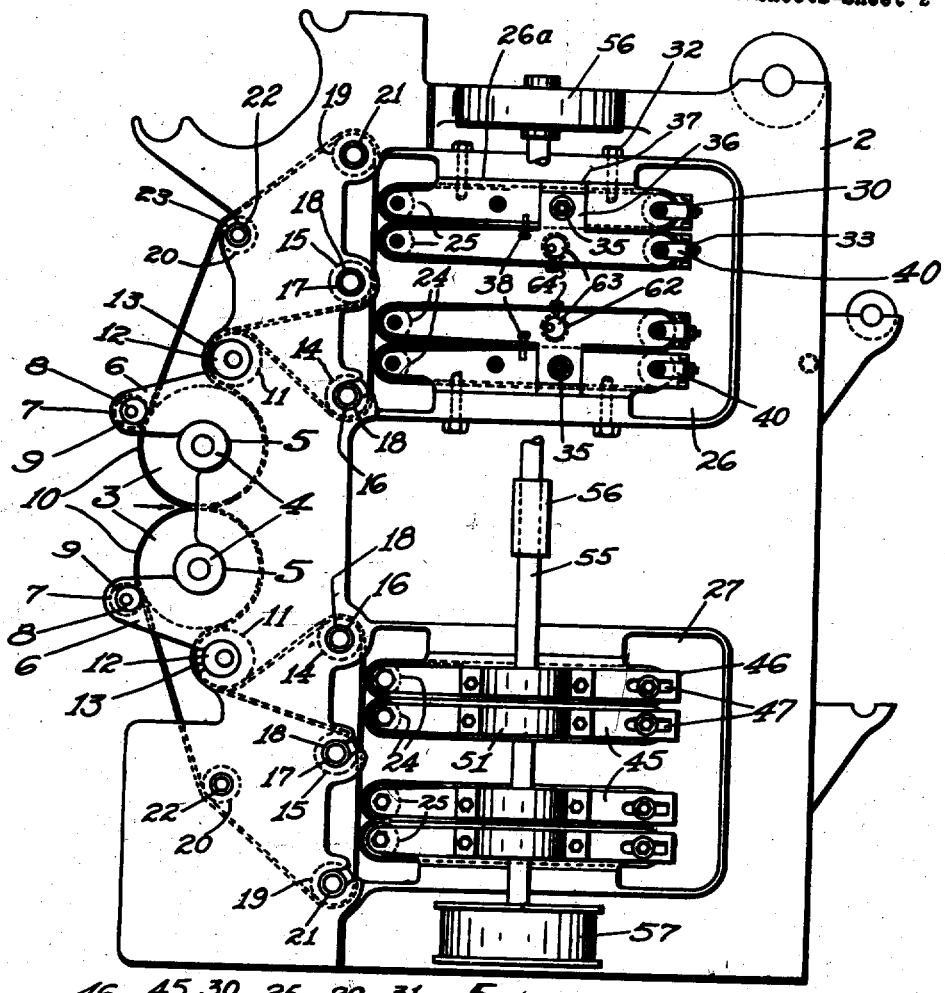
Figure 2 is a view partly in section and partly in side elevation, showing the opposite end of the machine shown in Fig. 1.

Referring to Figs. 1 and 2, the machine generally comprises end frames 1 and 2 between which are mounted the operating parts of the machine. A pair of dividing rolls 3, 3, are mounted at the front of the machine in suitable bearings 4, 4, supported in notches 5, 5, provided in the frame members 1 and 2. The frame members 1 and 2 are respectively provided with projecting portions 6, 6, for supporting guide rolls 7, 7, parallel to the axis of rotation of the dividing rolls 3, 3. The guide rolls 7 are rotatably mounted in excentric bushings 8, 8, that are carried in openings 9, 9, provided in the projecting portions 6, 6.

A plurality of tapes 10 are carried upon the dividing rolls 3, 3, and are held in engagement therewith by the guide rolls 7, alternate tapes being carried on the same roll 3. The tapes 10 extend from the guide rolls 7 almost around the periphery of each dividing roll 3 to a pair of rolls 11 that are rotatably mounted in excentric bushings 12 disposed in notches 13 in the end frames 1 and 2. The tapes 10 diverge at the rolls 11, one set of tapes passing to each of the delivery rolls 14 and 15. The rolls 14 and 15 are arranged in a vertical line and are supported by bushings 16 and 17 that are seated in notches 18 provided in the frames 1 and 2. The respective sets of tapes 10 come together again at the rolls 19 from whence they pass downwardly over rolls 20 to the guide rolls 7. The rolls 19 are rotatably mounted in bushings 21 carried in openings in the end frames and the rolls 20 are rotatably supported in bushings 22 carried in notches 23 in the end frame.

The web from the doffer on the carding machine is delivered to the tapes 10 between the dividing rolls 3, as indicated by the arrow, which divide the web equally, one half passing to each of the rolls 11. The web is then further divided by the divergence of the tapes 10, at the rolls 11, each individual tape then carrying a separate band to be formed into roving. The rolls 14 deliver the bands carried by their sets of tapes to pairs of rubbing aprons 24 and the rolls 15 deliver the bands carried by the other sets of tapes to pairs of rubbing aprons 25. The respective pairs of aprons 24 and 25 are supported in openings 26 and 27 provided in the end frames 1 and 2, and as the apron units located in the upper opening 26 are substantially the same in construction as the apron units located in the lower opening 27, it is only necessary to describe one complete set thereof.

Figure 4:
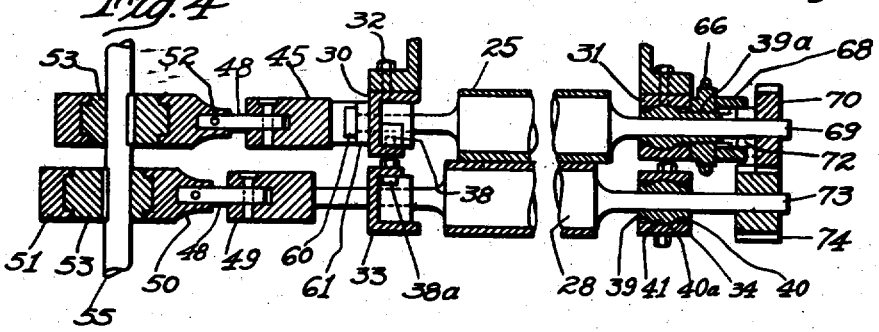
Figure 4 is an enlarged sectional view along the line 4—4, Fig. 3, showing both apron mechanisms.
Figure 3:
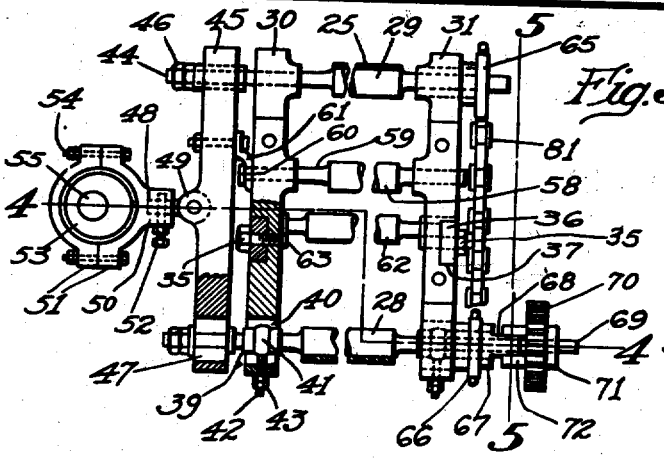
Figure 3 is a plan view partly in section, of the upper apron mechanism of a complete rubbing apron unit, only the intermediate roll for the lower apron being shown.

Referring now to Figs. 3 and 4, there is shown one complete rubbing apron unit, in which the aprons 25 are supported at their ends by rolls 28 and 29. The rolls 28 and 29 of the upper apron 25 are rotatably supported in end brackets 30 and 31, which are secured to bosses 26[a] at the top of the opening 26 in the end frames by bolts 32. The rolls 28 and 29 of the lower apron 25 are rotatably supported in end brackets 33 and 34 that are respectively secured to the end brackets 30 and 31 by means of bolts 35 passing through projecting portions 36 of the end brackets 33 and 34 that are received in slots 37 provided in the end brackets 30 and 31. The holes in the portions 36 for the bolts 35 are slightly larger than the bolts 35, so that the end brackets 33 and 34 are capable of vertical adjustment with respect to the end brackets 30 and 31. Adjusting studs 38, carried by the upper brackets 30 and 31, are provided with heads 38[a] engaging the lower brackets 33 and 34, so that the distance between the aprons 25 may be accurately adjusted by turning the studs 38 after loosening the bolts 35. The apron rolls 28 are supported at their ends in bushings 39 that are universally mounted in slots 40 provided in the end brackets 30, 31, 33 and 34, each bushing 39 being provided with a rounded peripheral portion 41 that fits in curved grooves 40[a] provided in the slot 40. Each bushing 39 is further provided with a stud 42, and nuts 43 in threaded engagement therewith, by means of which the rolls 28 may be shifted laterally in the brackets for regulating the tension of the aprons 25. The bushings 39 are also capable of universal movement, for a purpose to be hereinafter described.

The shafts 44 of the rolls 28 and 29 extend beyond the end brackets 30 and 33 and are secured to cross-head bars 45 by means of nuts 46 coacting with threaded end portions of the shafts 44. One end of each bar 45 is provided with a slot 47 in substantial alinement with the slots 40 of the end brackets 30 and 33, thus permitting lateral movement of the roll 28 with respect to the cross-head bar. A pin 48, pivotally mounted between lugs 49 on the cross-head bar 45, is secured to a boss 50 provided on one of two eccentric yoke members 51 by means of a stud 52. The eccentric yoke members 51 inclose an eccentric disk 53 and are secured together thereon by means of bolts 54. The eccentric disk 53 is carried on a vertical shaft 55 which, as best shown in Fig. 2, extends the height of the end frame 2, and is provided with an eccentric disk 53 for each one of the cross-head bars 45. The shaft 55 is rotatably mounted in suitable bearings 56 and is provided at its lower end with a pulley 57 by which it may be driven from a suitable source of power, not shown. The eccentric disks 53 for each pair of cross-heads 45 are offset with respect to each other, as shown in Fig. 4.

A middle apron roll 58 is rotatably mounted between the end brackets 30 and 31 and is provided with a shaft portion 59 which extends through the end bracket 30 and terminates in an enlarged head 60. The head 60 is embraced by a fork 61 carried by the cross-head bar 45, so that the middle apron roll 58 is adapted to move with the cross-head when the latter is moved back and forth by the eccentric disk 53. A middle roll 62 carried between the end brackets 33 and 34 is supported at its ends in eccentric bushings 63, and studs 64 are provided for holding the eccentric bushings 63 in position. By turning the bushings 63, the axis of the roll 62 may be shifted and in this way the distance between the middle rolls 58 and 62 may be adjusted without disturbing the adjustment between the end brackets 30 and 33 and 31 and 34, respectively.

Figure 5:
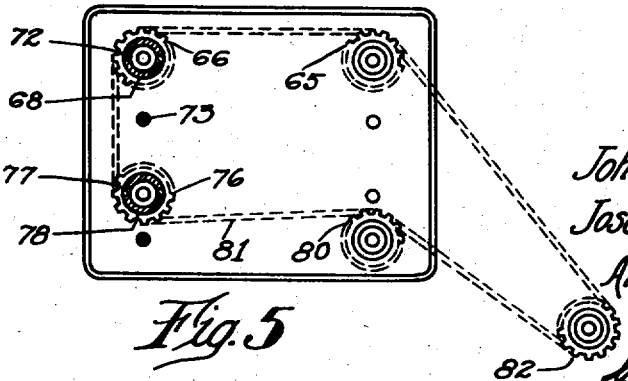
Figure 5 is a sectional view along the line 5—5, Fig. 3.

Referring particularly to Figs. 3, 4, and 5, sprocket wheels 65 and 66 are rotatably mounted on extensions 39[a] of the bushings 39 that are carried by the end bracket 31. The sprocket wheel 66 is provided with hub portion 67 upon which are formed a pair of dogs 68. The roll 28 carried between the upper end brackets 30 and 31 is provided with an extended shaft portion 69, upon which is mounted a spur gear 70. The spur gear 70 is provided with a hub portion 71 upon which are formed dogs 72 that are adapted to slide between the dogs 68 of the sprocket wheel 66, as the roll 28 is moved longitudinally by the eccentric disk 53, thus maintaining a continuous driving connection between the spur gear 70 and the sprocket wheel 66. The roll 28 carried between the lower end brackets 33 and 34 is provided with an extended shaft portion 73 at the end of which is mounted a spur gear 74 in mesh with the gear 70. The teeth of the spur gear 74 are somewhat wider than the teeth of the spur gear 70, so that these gears will remain in mesh when the rolls 28 are moved with respect to each other by the eccentrics.

All parts described thus far with relation to the upper set of aprons 25 form one complete apron unit. This unit can be removed from the machine, as a whole, after disconnecting the pin 48, from the eccentric yoke member 51 and removing the bolts 32 which secure the end brackets 30 and 31 to the end frames 1 and 2 respectively.

The upper apron roll 28 of the next pair of aprons is provided with a shaft extension upon which is mounted a spur gear 75 that is connected to a sprocket wheel 76 by dogs 77 and 78 in the same manner as the gear 70 is connected to the sprocket wheel 66. The lower apron roll 28 of this set of aprons is provided with a shaft extension which carries a spur gear 79 in mesh with the spur gear 75. An idler sprocket wheel 80 is rotatably mounted upon the bushing of the lower apron roll 29. The apron driving sprocket wheels 66 and 76 and the idler sprocket wheels 65 and 80 are connected by a continuous chain 81 which also passes around a driving sprocket wheel 82. As best shown in Fig. 1, the sprocket wheel 82 is mounted upon a shaft 83 that is driven from a power shaft 84 by means of gearing 85. A pulley 86 is mounted upon the shaft 84 and is adapted to be driven from a suitable source of power, not shown.

The two pairs of aprons located in the lower frame opening 27 are adapted to be driven in the same manner by means of apron driving sprocket wheels 87 and 88, the idler wheel 89, the driving wheel 90, and a continuous chain 91. The driving sprocket 90 is mounted on a shaft 92 that is also driven from the driving shaft 84 by suitable reduction gearing. Winding rolls 93 are mounted at the rear of the machine and are adapted to receive the condensed roving from the several pairs of aprons 24 and 25. The winding rolls 93 are adapted to be driven in unison by a belt 94 passing over a driving pulley 95 which is also connected to the driving shaft 84 by suitable gearing.

Having thus described the various parts entering into our invention the operation thereof is as follows:—The web from the carding machine is delivered between the rolls 3 from whence it passes onto the tapes 10 and is divided, substantially one half passing to each set of the tapes carried by the dividing rolls 3. The web is again divided at the rolls 11 by the divergence of the tapes 10 and the sets of alternate tapes carried by the rolls 14 and 15 deliver the separate ribbons to the rubbing aprons 24 and 25. The aprons 25 are given a reciprocating movement by the eccentrics and as the eccentrics of each set of aprons are offset with respect to each other, the aprons of each unit exert a rubbing action upon the web. At the same time the aprons are moved by the rolls 28 and as the separate ribbons are conveyed thereby they are condensed into roving which is then wound upon the rolls 93.

The particular advantageous features of our machine, as compared with machines heretofore constructed, will now be separately considered and pointed out. In the first place, the shafts of the delivery rolls 14 and 15 are rotatably supported in bushings that are seated in notches or openings provided in the end frames 1 and 2. In previous machines, the delivery roll shafts have been supported in bearings carried by brackets separately secured to the end frames, thus necessitating a very careful setting up and adjustment of the bearings on the frame, in order to maintain the delivery rolls in proper alinement with respect to the aprons. In our machine, the bearings are accurately positioned on the end frames so that there is little or no possibility of the bearings shifting with respect to the aprons after the rolls are once mounted thereon.

The embodiment of the several pairs of aprons in separate units which are readily removable from the machine is believed to be of great advantage, for in previous machines it has been necessary to partially dismantle the same in order to remove a pair of aprons. In our machine, it is only necessary to remove the studs 52 in order to disconnect the cross-heads of a pair of apron rolls from the eccentric yokes and to remove the bolts 32 holding the end frames in order to take out a complete apron unit with all of the roll mechanism attached thereto. Furthermore, the aprons of each unit are capable of adjustment in several ways. The tension of the aprons can be regulated by moving the end rolls 28 within the end brackets 30 and 31 and the distance between the aprons can be adjusted by moving the upper and lower end brackets with respect to each other, through the adjusting studs 38. The eccentric bushings 63 which support the middle apron rolls also permit of still closer adjustment of the distance between the middle portions of the aprons independently of the end brackets. The connection of the middle apron rolls to the cross-heads also reduces the amount of wear on the aprons which would otherwise occur if the middle apron rolls were stationary, as in previous machines. The universal mounting of the adjustable bearings 39 of the apron rolls 28 insures smooth running of the aprons for any tendency of the aprons to bind will be compensated for by pivotal movement of the bushings in the slots 40.

Lastly, the arrangement for driving the apron rolls without the use of direct reduction gearing between the roll shafts greatly simplifies the machine. It is highly desirable to be able to drive the rubbing aprons from the rolls farthest removed from the tapes, so that the rubbing surfaces will be drawn taut as the aprons move from the front to the rear of the machine. In previous machines, this result has been obtained only by the use of a large number of gears between the driving shaft and the apron roll shafts. In our machine, however, the provision of sprocket wheels coaxial with the apron roll shafts and the provision of sliding driving connections between the sprockets and the apron rolls, permits the use of a common driving chain, thereby eliminating the necessity of employing any intermediate gearing between the driving shaft and the apron rolls. This elimination of intermediate gearing at the drive end of the machine is believed to be highly advantageous, for it not only reduces the number of moving parts but also greatly increases the accessibility of the apron roll units. It is only necessary to disconnect the driving chain from the sprockets in order to remove an apron roll unit from the end of the machine. This would not be possible of attainment with the use of reduction gearing between the driving shaft and the apron roll shafts.

While we have shown our invention embodied in a condensing machine having a particular arrangement of parts, it is not so limited, but the several novel features thereof may as well be embodied in other machines of the same general type without departing from the spirit and scope of the invention. We desire therefore that only such limitations be imposed thereon as come within the scope of the appended claims.

We claim:

1. In a tape condensing machine, a pair of spaced supporting members, a rubbing apron carried at its ends by rolls slidable longitudinally in said supporting members, an adjusting roll extending through said apron intermediate its ends, and cylindrical bushings carried by said supporting members and each provided with an opening eccentric with respect to its axis for receiving an end of said adjusting roll, whereby turning of said bushings is adapted to shift the axis of said adjusting roll.

2. In a tape condensing machine, a pair of end brackets, a rubbing apron, rolls slidable longitudinally in said brackets for supporting said apron at its ends, an intermediate apron adjusting roll, and bushings carried by said brackets for rotatably and slidably supporting said intermediate roll, said bushings being eccentric about the axis of rotation of said intermediate roll, whereby said apron may be adjusted by turning said eccentric bushings.

3. In a tape condensing machine, a pair of rolls, a rubbing apron carried at its ends by said rolls, and a sleeve bearing capable of universal movement about a vertical axis for rotatably and slidably supporting one of said apron rolls.

4. In a tape condensing machine, a pair of brackets, a rubbing apron, a pair of rolls extending between said brackets for supporting said apron at its ends, and a sleeve bearing capable of universal movement about a vertical axis in a slot provided in one of said brackets for rotatably and slidably supporting one of said apron rolls.

5. In a tape condensing machine, end brackets, apron rolls, a pair of rubbing aprons each carried by a set of rolls rotatably mounted in horizontally alined end brackets, means for securing vertically alined brackets together, in pairs, with said aprons a predetermined distance apart, and further means for vertically adjusting the brackets to regulate the distance between said aprons.

6. In a tape condensing machine, end brackets, apron rolls, a pair of rubbing aprons each carried by a set of rolls rotatably mounted in horizontally alined end brackets, means for securing vertically alined brackets together, in pairs, with said aprons a predetermined distance apart, and means coacting with each pair of said brackets for adjusting the distance between said aprons.

7. In a tape condensing machine, end brackets, apron rolls, a pair of rubbing aprons each carried by a set of rolls rotatably mounted in horizontally alined end brackets, means for securing vertically alined brackets together, in pairs, with said aprons a predetermined distance apart, and studs respectively having an operating portion between each pair of brackets for adjusting the distance between said aprons.

8. In a tape condensing machine, end brackets, apron rolls, a pair of rubbing aprons each carried by a set of rolls rotatably mounted in horizontally alined end brackets, means for securing vertically alined brackets together, in pairs, with said aprons a predetermined distance apart, and means for shifting the axis of rotation of one of said rolls for adjusting the distance between said aprons.

9. In a tape condensing machine, end brackets, apron rolls, a pair of rubbing aprons each carried by a set of rolls rotatably mounted in horizontally alined end brackets, the said brackets and the said rolls being vertically adjustable with respect to each other to vary the distance between the aprons.

10. In a tape condensing machine, end brackets, apron rolls, a pair of rubbing aprons each carried by a set of rolls rotatably mounted in horizontally alined end brackets, the said brackets being vertically adjustable with respect to each other to vary the distance between the rolls, and the axis of rotation of one of said rolls being shiftable to vary the distance between the aprons.

11. In a tape condensing machine, end brackets, apron rolls, a pair of rubbing aprons each carried by a set of rolls rotatably mounted in horizontally alined end brackets, the brackets and rolls for one apron being fixed and the brackets and one roll for the other apron being vertically adjustable with respect thereto for regulating the distance between said aprons.

12. In a tape condensing machine, a rubbing apron, a cross member, a plurality of apron rolls slidably mounted and connected to said cross member, a rotatable shaft provided with an eccentric disk, a yoke embracing said disk and provided with a boss having an opening therein, a pin pivotally mounted on said cross member and extending into said opening and means co-acting with said boss for removably securing said pin in said opening.

13. In a tape condensing machine, a rotatable shaft, a pair of rubbing aprons, a stationary frame member, a plurality of apron rolls rotatably and slidably mounted in bearings carried by said frame member, means for longitudinally moving said rolls, a sprocket wheel rotatable about the axis of one of said rolls, a chain connecting said sprocket wheel to said rotatable shaft, and a driving connection between said sprocket wheel and its associated roll, whereby said roll is driven by said shaft simultaneously with longitudinal movement in its bearings.

14. In a tape condensing machine, rotatably and slidably mounted rolls, a rubbing apron carried on said rolls, one of which is provided with a shaft having a gear mounted at its end, means for shifting said shaft longitudinally, and a sprocket wheel coaxial with said shaft and continuously connected to said gear by dogs in sliding engagement.

15. In a tape condensing machine, rotatably and slidably mounted rolls, a pair of rubbing aprons carried on said rolls, one roll of each apron being provided with an extended shaft, intermeshing gears carried by said shafts, and a sprocket wheel coaxial with one of said shafts for continuously driving said gears.

16. In a tape condensing machine, rotatably and slidably mounted rolls, a pair of rubbing aprons carried on said rolls, one roll of each apron being provided with an extended shaft, and the said shafts being adapted for relative longitudinal movement, intermeshing gears having teeth of different length carried at the ends of said shafts and a sprocket wheel coaxial with one of said shafts and continuously connected to one of said gears by sliding dogs.

17. In a tape condensing machine, a rotating shaft, a rubbing apron, a pair of rotatably and slidably mounted rolls carrying said apron, means for longitudinally moving said rolls, a sprocket wheel coaxial with the extended shaft of one of said rolls, a chain connecting said sprocket wheel to said rotating shaft, and a slidable driving connection between said sprocket wheel and said roll shaft, whereby said apron is adapted to be driven by the rotation of said rolls simultaneously with the longitudinal movement thereof.

Dated this seventeenth day of November, 1923.

JOHN H. KOVAR.
JOSEPH F. SCHIMEK.
ALEXANDER CAVEDON.